United States Patent [19]

Savisalo et al.

[11] Patent Number: 5,290,401
[45] Date of Patent: Mar. 1, 1994

[54] METHOD AND A DEVICE FOR SEPARATING PLASTIC PARTICLES FROM SUPENSIONS

[75] Inventors: Hannu Savisalo, Mikkeli; Martti Pulliainen, Anttola, both of Finland; Markku Ainali, Västerås, Sweden; Timo Laurila; Pentti Järvelä, both of Tampere, Finland; Esko Pääkkönen, Nokia, Finland

[73] Assignee: Savcor-Consulting Oy, Finland

[21] Appl. No.: 807,844

[22] PCT Filed: May 9, 1991

[86] PCT No.: PCT/FI91/00146

§ 371 Date: Jan. 10, 1992

§ 102(e) Date: Jan. 10, 1992

[87] PCT Pub. No.: WO91/17304

PCT Pub. Date: Nov. 14, 1991

[30] Foreign Application Priority Data

May 10, 1990 [FI] Finland ................... 902345
May 10, 1990 [FI] Finland ................... 902346

[51] Int. Cl.⁵ ............................................. D21B 1/32
[52] U.S. Cl. .................................... 162/4; 204/132; 209/12; 209/155
[58] Field of Search .............. 162/4, 55; 204/130, 204/132, 140; 209/12, 155, 156, 173, 127.1, 129.0, 2; 241/14, 20, 40, 41

[56] References Cited

U.S. PATENT DOCUMENTS

| 914,368 | 3/1909 | Boudot | 204/132 |
|---|---|---|---|
| 1,008,779 | 11/1911 | Bonser | 204/132 |
| 2,743,178 | 4/1956 | Kronel | 162/4 |
| 2,916,216 | 12/1959 | Altmann | 162/4 |
| 3,025,213 | 3/1962 | Copeland | 162/4 |
| 3,098,784 | 7/1963 | Gorman | 162/5 |
| 3,173,827 | 3/1965 | Altmann et al. | 162/4 |
| 3,284,282 | 11/1966 | Immel | 162/55 |
| 3,615,014 | 10/1971 | Hruby | 162/4 |
| 3,835,006 | 9/1974 | Fujita et al. | 204/180 |
| 4,000,031 | 12/1976 | Acobas | 162/4 |
| 4,219,381 | 8/1980 | Schnell | 162/4 |
| 4,483,768 | 11/1984 | Gazzoni | 209/173 |
| 4,650,570 | 3/1987 | Fjallström | 162/55 |
| 5,062,932 | 11/1991 | Pulliainen | 204/130 |
| 5,110,454 | 5/1992 | Parker et al. | 209/173 |

FOREIGN PATENT DOCUMENTS

| 7803035 | 5/1979 | Finland . |
| 822894 | 2/1983 | Finland . |
| 81393 | 5/1990 | Finland . |
| 9014890 | 12/1990 | PCT Int'l Appl. . |
| 8125510 | 10/1982 | United Kingdom . |

Primary Examiner—W. Gary Jones
Assistant Examiner—Brenda Lamb
Attorney, Agent, or Firm—Steinberg & Raskin

[57] ABSTRACT

The invention relates to a method for separating plastic particles (P) from a suspension (L), e.g. from a cellulose mass or cellulose pulp suspension, in which the fiber-floc material is broken for loosening the plastic particles (P). In the method, turbulent flows are caused to said suspension (L), by means of which flows the particles (P) to be separated are separated from the remaining mass as the fiber network is decomposing, whereby lighter particles (P) are separated. In the method, the suspension (L) obtained in the previous phase is subjected to such a treatment that a concentration difference is achieved, which prevents the fiber network from reforming and thereby the plastic particles (P) from binding thereto, and a flow (F) is directed to the separation point, where the plastic particles (P) are separated from the suspension (L). The invention also relates to a device for separating plastic particles from suspensions, especially cellulose and paper fiber suspensions, which device comprises a container (12) and guiding means (13,14) fitted thereto for achieving turbulent flows and means (23,24,25) for diluting and/or orientating the suspension and which device further comprises separating means (19) for separating the particles from the suspension.

17 Claims, 2 Drawing Sheets

METHOD AND A DEVICE FOR SEPARATING PLASTIC PARTICLES FROM SUPENSIONS

The invention relates to a method for separating plastic particles from a suspension, e.g. from a cellulose mass or cellulose pulp suspension, in which the fiber-floc material is broken for loosening the plastic particles.

The invention also relates to a device for separating plastic particles from a suspension, e.g. from a cellulose mass and paper fiber suspension.

In many previously known solutions, the removal of the plastic from among the cellulose fibers has mainly been based on the density of the plastic, either in a liquid phase or in centrifugal methods.

The earlier FI patent application 885180 or U.S. Pat. No. 5,062,932 by the applicant describes a method and a device for separating plastic particles from solutions, which approach is based on an electrical separation of plastic particles. In this known method, the plastic particles in the solution have been separated electrically by placing in the solution an anode and a cathode and by adjusting the potential of the anode and the cathode so that it is possible to separate the plastics from the solution.

The object of the present invention is to provide a method and a device for separating plastics from a suspension, e.g. cellulose suspension, to be able to analyze the quantity of the plastics in the suspension and perform necessary studies, related e.g. to the origin and quality of the plastic, etc.

The method according to the invention is mainly characterized in that in the method
 a) turbulent flows are caused to said suspension, by means of which flows the particles to be separated are separated from the remaining mass as the fiber network is decomposing, whereby lighter particles are separated,
 b) the suspension obtained in the phase a) is subjected to such a treatment that a concentration difference is achieved, which prevents the fiber network from reforming and thereby the plastic particles from binding thereto, and
 c) a flow is directed to the separation point, where the plastic particles are separated from the suspension.

The device according to the invention is mainly characterized in that the device comprises a container and guiding means fitted thereto for achieving turbulent flows and means for diluting and/or orientating the suspension and that the device further comprises separating means for separating the particles from the suspension.

In other embodiments of the present invention, the plastic particles are separated from the suspension at a separation point either mechanically, electrically, or both. The plastic particles (P) can also be separated by means of a collecting scoops on a collector or guided to a surface of the container and then separated into an overflow of the container. Other possible embodiments are described.

It is essential in the inventive method and device that the turbulence causes the breaking of the fiber/floc material as a result of shearing forces. The turbulence can be achieved by means of a liquid jet, as described above, but it is also possible to use a rotatable cylindrical rotor, or by allowing two separate mass flows to collide against each other. In addition, the turbulence can also be achieved so that a mass suspension is sprayed within the mass suspension by means of pressure. It is also possible to mix the mass mechanically under the surface.

It is also essential in the inventive method and device that the height of the turbulence area is low, whereby the plastic particles have a short way to transfer to the surface of the suspension material container. It is also advantageous that another turbulence area is achieved after the first guide plate. Different consistency gradients are caused to the suspension in the container by the interaction of the turbulences and the liquid flows. The plastic particles can then loosen from the fiber/floc material and cannot return to the fiber. For intensifying the consistency gradients, it is also possible to add to the surface of the suspension material mixture a material with a consistency of 0% by spraying thereon e.g. more liquid.

Instead of the flow guiding plates, the flow can also be guided e.g. by changing the shapes of the container.

It is also possible to break the fiber/floc material for loosening the plastic particles so that a momentary reduction is caused to the suspension flow.

In the inventive method and device, the separation of the plastic is based on the breaking of the fiber material binding the plastic particles by means of a turbulence and pressure jets, whereby the particles are released and rise to the surface as a result of a consistency gradient thus formed. The plastics can be collected from the surface either electrically and/or mechanically.

When separating plastic from e.g. cellulose, the inventive device is preferably located in a sorting space e.g. after the second or third sorting, resulting from the enrichment of the plastics in the flow-off.

The inventive method and device are next described in detail with reference to the figures of the accompanying drawing, to which the invention is not intended to be narrowly limited in any way.

The principle of the invention is based on the fact that the plastics, which are intended to be separated from the suspension, are lighter than the fiber material in the suspension, whereby the plastics inherently tend to rise to the surface of the suspension. The rising of the plastics to the surface is in most conditions, e.g. in laminar flow conditions, when the solids content is more than 0.02% by weight, is prevented by the fiber and floc material. In order to be able to release the plastics, the fiber/floc material, or the floccule, has to be decomposed. When the flocs have been decomposed, the plastics rise to the surface, from which they can be collected.

Figure 1:
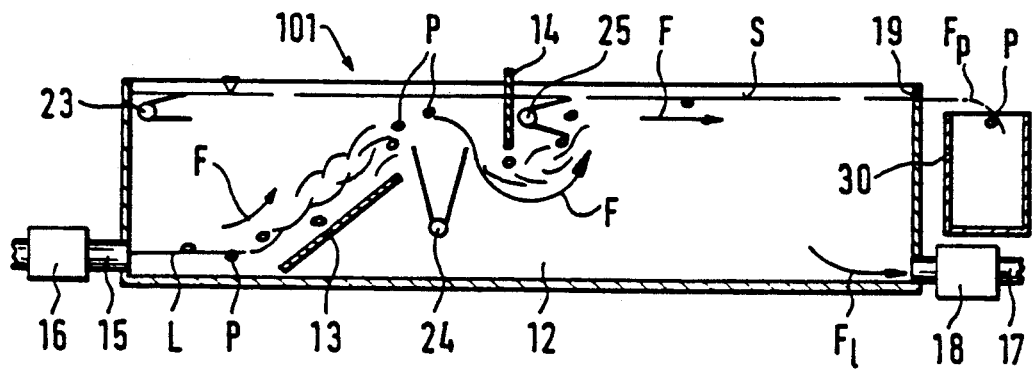
FIG. 1 shows schematically the inventive device for realizing the inventive method, in which device the plastic particles which have risen to the surface are removed to an overflow.

According to FIG. 1, a suspension L is led into a container 12 via a feeding pipe 15 and a feeding valve 16. When the suspension L has entered the container 12, its flow F is guided with a guide plate 13 so that the direction of the fiber flow F is towards a surface layer S of the container 12. In FIG. 1, the plastic particles are designated with a reference letter P. The suspension L is then led with a liquid jet 23 along the liquid surface S of the container 12 and further by means of a second liquid jet 24, a guide plate 14 and a third liquid jet 25 towards an overflow opening 19 of the container 12. The liquid jets 23,24,25 to be directed to the flow F cause a shearing stress and turbulence to the floc material, whereby the plastic particles P are released from the floc material and rise to the surface S of the container 12.

From the overflow opening 19 the flow $F_P$ containing plastic particles P is led into a container 30. A portion $F_L$ of the suspension containing fiber and floc material and released from the plastic particles P is led out of the container via a discharge valve 18 and a discharge pipe 17.

Figure 2:
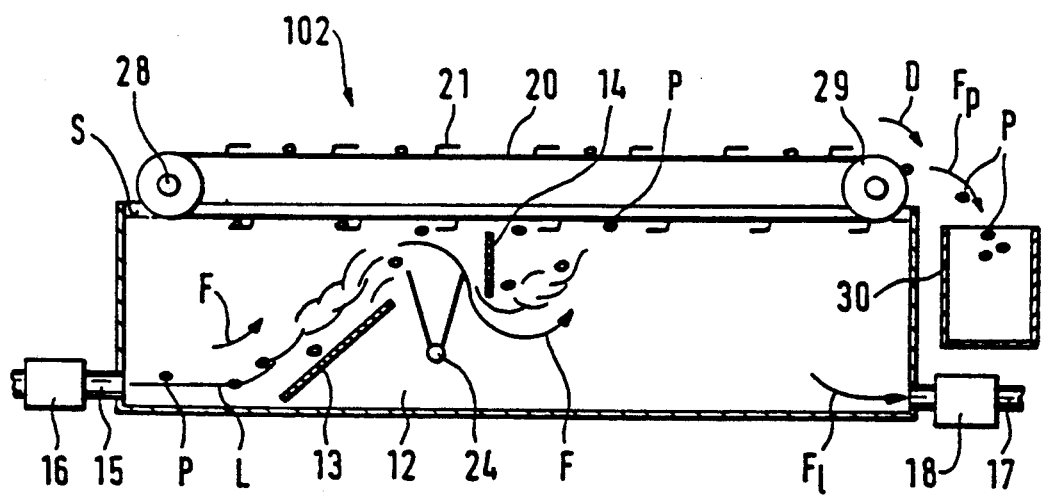
FIG. 2 shows schematically the inventive device for realizing the inventive method, in which device the plastic particles which have risen to the surface are removed mechanically by means of a collector.

In the embodiment of FIG. 2, a device 102 is comprised of the container 12, into which the suspension L is led via the feeding pipe 15 and the feeding valve 16. The suspension advances as the flow F guided by the guide plate 13, until is arrives at the liquid jet 24, which liquid jet causes the decomposition of the fiber/floc material by the action of a turbulence and shearing stress. The plastic particles P releasing from the fibers and the flocs and the suspension L is led further as the flow F towards the liquid surface S of the container 12.

In the immediate vicinity of the liquid surface S of the container 12 is fitted in the embodiment of FIG. 2 a wire collector 20, which is provided with transverse collecting scoops 21. The wire collector 20 rotates around guide rolls 28, 29 in its rotational direction D. The scoops 21 then collect the plastic particles P from the surface S of the suspension L. The wire collector 20 conveys the plastic particles P further as the flow $F_P$ into a discharge container 30. A suspension flow $F_L$ containing liquid, flocs and fibers is led via the discharge valve 18 and the discharge pipe 17 out of the container 12.

Figure 3:
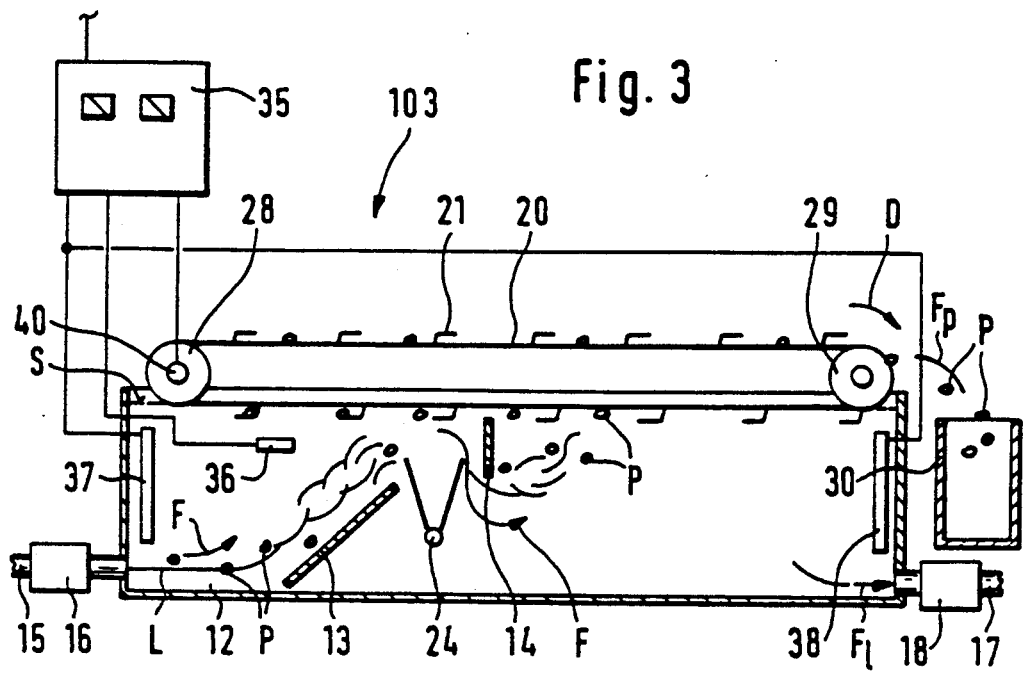
FIG. 3 shows schematically the inventive device for realizing the inventive method, in which device the plastic particles which have risen to the surface are removed electrically by means of a collector.

In the embodiment of FIG. 3, the collection of the plastic particles P in a device 103 is based on an electrical separation. The suspension L is led into the container 12 via the feeding valve 16 and the feeding pipe 15, and the flow is guided with the guide plate 13 and the fiber/floc material is decomposed with the liquid jet 24, and the flow F is guided further with the guide plate 14. The plastic particles P are collected with the wire collector 20 provided with the collecting scoops 21. The plastic particles P are collected on the basis of potential differences, and the electrodes in the suspension are designated with reference numbers 37 and 38. The comparison electrode is marked with a reference number 36. From a power source 35 is also led a current to the wire collector 20, which is then charged electrically, forming its own electrode 40.

The plastic particles P are collected from the suspension L in the container 12 in such a way that a voltage is caused to the electrodes 37,38 and 40 by the action of the power source 35, e.g. a DC source. When a potential difference prevails between the electrodes 37,38 and 40, the particles P attach to an electrode having a suitable potential, most suitably to the wire collector electrode 40. The potential of the remaining electrodes 37,38 and 40 is monitored by means of the comparison electrode 36 and the potential of the electrodes 37,38 and 40 is controlled on the basis of the measurement results of the comparison electrode 36 so that they remain suitable, i.e. such that the plastic particles P are guided to the wire collector acting as the electrode 40.

The plastic particles P are removed as the flow $F_P$ from the wire collector 20 acting as the electrode 40 to the container 30. The remaining portion of the suspension L, i.e. the liquid material and the fiber material as well as the flocs, leaves as the flow $F_L$ via the discharge valve 18 and the discharge pipe 17.

Figure 4:
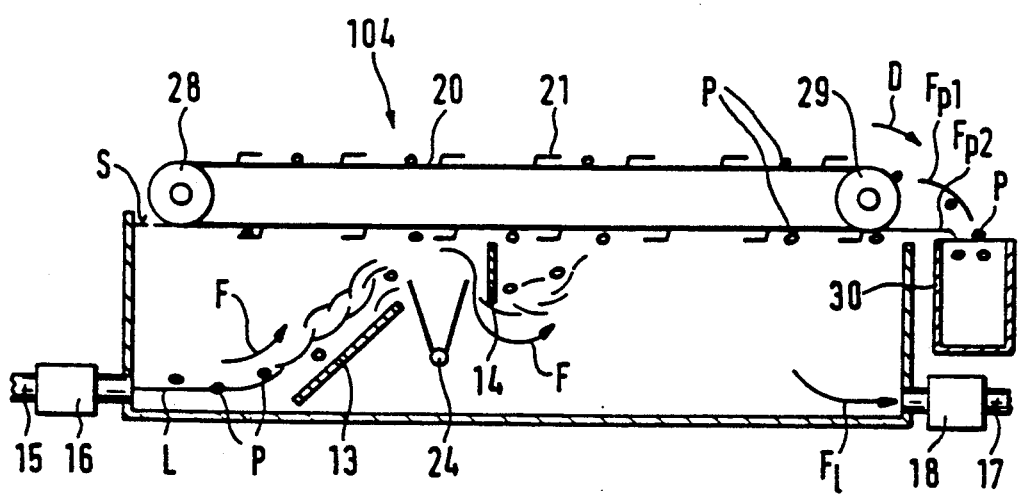
FIG. 4 shows schematically the inventive device for realizing the inventive method, in which device the plastic particles which have risen to the surface are removed both mechanically by means of a collector and to an overflow.

The embodiment of a device 104 shown in FIG. 4 is a combination of the devices 101 and 102 shown in FIG. 1 and 2 in such a way that the removal of the plastic particles P occurs as two flows $F_{P1}$ and $F_{P2}$ such that the flow $F_{P1}$ is removed by means of the wire collector 20 and collecting scoops 21 and the flow $F_{P2}$ leaves directly as an overflow for the container 30.

In addition to the open-pool type constructions shown in the figures, the inventive devices for realizing the inventive method can be adapted to operate under pressure.

The inventive devices described above can, for realizing the inventive method, be placed one after the other or side by side so that any embodiment can be combined with any embodiment.

The invention has above been described with reference to its preferable embodiments, but the intention is not to limit the invention in any way to this example, but many changes and modifications are possible within the inventive idea defined in the enclosed patent claims.

We claim:

1. A method for separating plastic particles from a cellulosic pulp suspension, comprising
    flowing a suspension into a container containing plastic particles within a decomposable fiber network whereby turbulent flows are produced such that the particles are separated from the suspension as the fiber network decomposes,
    manipulating the flow of the suspension after the particles have been separated therefrom such that the fiber network is prevented from reforming and thereby the separated plastic particles are prevented from binding thereto, and
    directing the suspension and separated plastic particles to a removal point, where the plastic particles are mechanically and electrically separated and removed from the suspension.

2. A method according to claim 1, further comprising guiding the plastic particles to a surface of the container and flowing the plastic particles into an overflow of the container.

3. A method according to claim 1, wherein the plastic particles are separated at the removal point by collecting the plastic particles by means of collecting scoops of a collector.

4. A method according to claim 1, wherein said plastic particles are electrically separated and removed from the suspension to an electrode having a suitable potential in a DC source-electrode system connected to the container.

5. A method according to claim 1, further comprising treating the suspension containing plastic particles at the removal point by diluting the suspension such that a consistency gradient is intensified and a loss of fiber from the suspension is eliminated.

6. A method according to claim 1, further comprising providing guide means to produce the turbulent flows.

7. A method according to claim 6, wherein the guide means comprise guide plates.

8. A method according to claim 1, wherein the flow of the suspension is manipulated by means of liquid jets.

9. A method as claimed in claim 1, further comprising flowing the suspension into the container such that as a result of turbulent flows in the container, the plastic particles rise to an upper surface of the container based on a weight difference between the plastic particles and the fiber network of the suspension.

10. A method as claimed in claim 9, wherein the removal point is located at an end of the container opposite a point at which the suspension enters the container such that the suspension flows through the container.

11. A method as claimed in claim 1, wherein the flow of the suspension is manipulated by means of a liquid jet arranged within said container such that the separated plastic particles travel in an area of turbulence produced by the liquid jet between the separation point and the removal point thereby preventing the plastic particles from binding to the decomposed fiber network.

12. A device for separating plastic particles from cellulosic fiber suspensions containing plastic particles in a fiber network comprising a container having an intake for a cellulosic fiber suspension, guiding means arranged within said container for producing turbulent flows in said container such that plastic particles in the suspension separate from a fiber network of the suspension, manipulating means for manipulating the flow of the suspension in said container such that the separated plastic particles are prevented from binding to the fiber network, said manipulating means being arranged within said container, and removal means for mechanically and electrically removing the plastic particles from the suspension, said removal means being located above said guiding means and said manipulating means and arranged in said container.

13. A device according to claim 12, wherein said guiding means comprise guide plates.

14. A device according to claim 12, wherein said manipulating means comprise a plurality of liquid jets.

15. A device according to claim 12, wherein said removal means comprise a wire collector and collecting scoops attached to said wire collector.

16. A device according to claim 12, wherein said removal means comprise an overflow opening arranged at an edge of said container.

17. A device according to claim 12, wherein said removal means comprise a DC source-electrode system, said system comprising an electrode whose potential is arranged in such a way that the plastic particles are guided thereto.

* * * * *